United States Patent Office

2,901,465
POLYESTER AND PROCESS OF MAKING THE SAME

James H. Sample, Chicago, Ill., assignor to The Sherwin-Williams Company, Cleveland, Ohio, a corporation of Ohio No Drawing. Application October 6, 1955
Serial No. 539,029

8 Claims. (Cl. 260—75)

This invention relates as indicated to a novel polyester and the process of making the same.

In the manufacture of vehicles suitable for use in baking enamels, experience has shown that the presence of natural oil components has adversely affected the ability of the vehicle to retain its color and gloss. Also of considerable influence on the color of the initial vehicle, the color and gloss retention, and the flexibility of the final film, is the polyol. While glycerine is an inexpensive polyol, experience has shown that it does not provide a satisfactory initial color nor is it entirely satisfactory in color retention. Glycols and ether glycols have not been particularly satisfactory in color retention and also provide undesirably low viscosity in the final vehicle.

It is a principal object of this invention, therefore, to provide a novel polyester material particularly satisfactory for use in various baked film applications.

Another object of this invention is to provide an oil-free polyester which will retain the best color at regular baking temperatures and, more importantly, during overbakes or at temperatures higher than conventional, shows an improved ability to retain its color.

Still another object of this invention is to provide an oil-free polyester useful in various baked film applications which is readily compatible with certain amino resins and which polyesteramino resin combination will not show substantial discoloration if held longer or if the baking temperatures are more than expected.

Still other objects of this invention will appear as the description proceeds. Broadly stated, this invention comprises the process of making a viscid oil-free polyester having an acid value less than 5 which comprises heating together at a temperature between about 350° F. and 450° F. an aliphatic polyol containing at least 3 OH groups attached to different non-adjacent carbon atoms, an alkyl di-ester of an aromatic dibasic acid selected from the group consisting of isophthalic acid, terephthalic acid, and mixtures thereof, the alkyl group containing from 1 to 4 carbon atoms, and an aliphatic dibasic acid having the general formula:

$$HO_2C(CH_2)_nCO_2H$$

wherein $n$ is a number from 1 to 8 inclusive, the proportion of polyol being such as to provide an average of from about 1.2 to 1.5 hydroxyl groups per carboxyl group and the ratio of carboxyl groups in the aliphatic dibasic acid to the carboxyl groups in the aromatic di-ester being from about 3:1 and to about 1:4. Also contemplated by this invention is the product produced by the aforesaid process.

The polyesters of the present invention are comprised of three primary materials. The first of these is an aliphatic polyol containing at least 3 hydroxyl groups attached to different non-adjacent carbon atoms.

Perhaps the most useful of the polyols from the standpoint of availability and result is trimethylol ethane. This material seems to provide a combination of good initial color, good color and gloss retention and flexibility. Pentaerythritol and polypentaerythritol is similar to trimethylolethane. They process somewhat more rapidly and provide a more brittle material. Glycerine does not provide as satisfactory an initial color and it is not the equivalent of trimethylolethane in color retention. Trimethylolpropane may also be used. The various dihydric alcohols or glycols such as ethylene, propylene, triethylene, glycol, etc. as well as the ether glycols are not the equal of the preferred materials in color retention. Additionally, the dihydric aliphatic alcohols provide undesirably low viscosities. Experience has shown that the preferred polyols contain hydroxyls on carbon atoms which are not adjacent to each other, as is the case with the polyalkylol alkanes.

The next essential component is an alkyl di-ester of an aromatic dibasic acid selected from the group consisting of isophthalic acid and terephthalic acid. Phthalic acid or phthalic anhydride process too rapidly and do not enable the attainment of a very low acid number before gellation occurs. It has been found that the lower alkyl di-esters of isophthalic acid and terephthalic acid are especially suited to the production of the present polyesters in that they enable the reaction to be controlled so that extremely low acid values in the final resin can be secured. Specific examples of isophthalates and terephthalates which may be used include dimethyl isophthalate, dimethyl terephthalate, diethyl isophthalate, diethyl terephthalate, dipropyl isophthalate, dipropyl terephthalate and the butyl and tertiary butyl di-esters of isophthalic and terephthalic acid. In general, the alkyl group should contain from 1 to 4 carbon atoms as the rate of ester interchange decreases with increasing length of the carbon chain in the alkyl group.

The next essential ingredient has been defined above as an aliphatic dibasic acid having the general formula:

$$HO_2C(CH_2)_nCO_2H$$

wherein $n$ is a number from 1 to 8 inclusive. Specific examples of such dibasic aliphatic acids include malonic, methyl malonic, succinic, methyl succinic, glutaric, adipic, pimelic, suberic, azelaic and sebacic. The function of the dibasic aliphatic acid appears to be to impart suitable flexibility to the film and in this regard, the ratio of the dibasic aliphatic acid to the aromatic acid ester is important. Flexibility is also, of course, influenced to some extent by the choice of the polyol. Occasionally it is desirable to further modify the polyester by the inclusion of a monobasic acid such as benzoic or para-tertiary butyl benzoic. These materials appear satisfactory from a color retention standpoint but the introduction would be made only to modify some other quality such as cost or reaction speed. For most purposes, aliphatic dibasic acids containing from 4 to 8 carbon atoms are preferred.

Example 1

153 grams of adipic acid, 600 grams of trimethylol ethane, 808 grams of dimethyl isophthalate and 2 grams of calcium oxide were mixed in a flask equipped with a thermometer and stirring equipment. The temperature of the mass was raised to 350° F. in about 30 minutes, increasing to a temperature of about 390° after a total of 3 hours. This temperature was held for about 2.5 hours, at which point it was increased to 420° F. After about 5½ hours of cooking, the acid value was found to be 3.7 and at the end of 7 hours it was 0.8. The batch was then cut to 55% solids in a mixture of 2 parts of butyl Cellosolve (ethylene glycol monobutyl ether) to 1 part of xylol. The base yield of polyester was 1340 grams. The viscosity was T+ (Gardner-Holdt) at 55% solids. In this particular example, there were 1.44 hydroxyl groups per carboxyl group. For every carboxyl group contributed by the adipic acid, 4 were contributed by the dimethyl isophthalate.

Example 2

153 grams of adipic acid, 520 grams of trimethylol ethane and 808 grams of dimethyl isophthalate were admixed and heated in a period of 4.5 hours to a temperature of 420° F., the temperature reaching 350° F. in about 45 minutes.

At the end of 6.25 hours, 2 grams of calcium oxide were added. The acid number at the end of 8 hours was 3.3 and the cook was carried to a cure of 17 seconds, requiring a total time of 8.75 hours. The resulting product had a viscosity of U+ (Gardner-Holdt), a color of 1 to 2, Gardner, and an acid value of 2.47. The base yield was 1205 grams, which was cut to 55% solids in a mixture of 2 parts of butyl Cellosolve to 1 part of xylol.

In this particular case there were 1.25 hydroxyls for each carboxyl group. For every carboxyl group contributed by the adipic acid, 4 were contributed by the dimethyl isophthalate.

Example 3

323 grams of dimethyl isophthalate, 243 grams of adipic acid and 249 grams of pentaerythritol were heated for about an hour to 350° F. and in another hour the temperature had increased to 370° F. The temperature was held at 370° F. for an hour, at which point is was increased to 390° F. requiring about 25 minutes. This temperature was maintained for about 3 hours, at which time the temperature was then increased to 400° F. where it was maintained for 1 hour and 20 minutes, or until the cure reached 27 to 30 seconds. This product had an acid number less than 5, giving a base yield of 741 grams, which was cut to 55% solids and a mixture of 2 parts of butyl Cellosolve and 1 part of xylol.

In this reaction there were available an average of 1.3 hydroxyl groups per carboxyl group and for each carboxyl group contributed by the adipic acid, one was contributed by the dimethyl isophthalate.

Example 4

An interesting example illustrating what happens when one attempts to make the polyester using the di-ester of the aliphatic acid and the acid form of the aromatic dibasic acid is as follows: 195 grams of dimethyl adipate, 186 grams of isophthalic acid and 233 grams of trimethylolethane were mixed and in 35 minutes the temperature was raised to 370° F., the mass was turbid and had a cure in excess of 120 seconds. In 1 hour the temperature was raised to 380° F. where it was maintained for 2 hours. The temperature was then raised to 400° F. where it is continued for an additional ½ hour, at which point the cure fell rapidly to 17 seconds. The mixture was still turbid and it was cut promptly in the solvent used in the previous examples to a solids content of 55%. The base yield was 480 grams. This product had a viscosity of Z— (Gardner-Holdt), a color of 2 to 3, an acid value of 63 and a cure of 10 seconds.

Example 5

3.15 mols of adipic acid, 13 mols of trimethylol ethane and 12.5 mols of dimethyl isophthalate were admixed, a carbon dioxide blanket applied and the mixture heated with stirring in a period of 50 minutes to a temperature of 350° F. where it was held for 1 hour. At the end of this time the temperature was raised to 370° F. where it was held for 50 minutes and then raised to 390° F. where it was held for 2 hours and 50 minutes. At the end of this time the temperature was increased to 420° F. When the temperature reached 420° F. (8 minutes' time) the acid value was 10.5 and 45 minutes later it was 7.6. At this point 6 grams of calcium oxide were added. The cure was more than 120 seconds. The temperature was maintained at 420° F. for a total of 3.75 hours. The base yield was 3584 grams, which was cut to 55% solids in the solvent used in the previous examples. This polyester had a viscosity of T, a color of 1 to 2, an acid number of 0.9 and a weight per gallon of 8.83.

Example 6

3.33 mols of dimethyl isophthalate, 3.2 mols of adipic acid and 5.72 mols of trimethylolethane were mixed and placed under a carbon dioxide blanket. The temperature was increased in ½ hour to 370° F. where it was held for 1 hour. In 10 minutes a temperature of 390° F. was gained and held for about 2 hours. 420° F. was then gained in 15 minutes and held at that temperature for 3.75 hours. Shortly after reaching 420° F., 2 grams of calcium oxide were added. At the end of 6¾ hours, an additional 1 gram of calcium oxide was added, the entire cook requiring 7.5 hours, including the half hour heat up time.

The final product weighed 1468 grams and was cut to 55% solids. This material had a viscosity of V to W, a color of 1–2, an acid number less than 1 and a weight per gallon of 8.72.

There were available in this reaction mass 1.31 hydroxyl groups for each carboxyl group, the adipic acid and dimethyl isophthalate each contributing the same number of carboxyl groups.

Example 7

3.33 mols of dimethyl isophthalate, 9.98 mols of adipic acid and 16.8 mols of trimethylolethane were processed as in the previous examples to a final temperature of about 420° F. The base yield was 1450 grams, and the product was cut to 55% solids in a solvent composed of 2 parts of butyl Cellosolve and 1 part of xylol.

The product had a viscosity of $Z_1+$, a color of 1 to 2, an acid value of 4.8 and a cure of 3 seconds.

In this particular example, the ratio of the components contributed by the aliphatic di-acid to the components contributed by the aromatic di-ester was 3:1.

Example 8

840 grams of dimethyl terephthalate, 630 grams of adipic acid and 892 grams of trimethylolethane were reacted in the manner set forth in Example 5. When the acid value of the cook had reached less than about 10, 2 grams of calcium oxide catalyst were added. Ordinarily catalyst is added to these reactions when the acid value is 10 or below and preferably 3 or 4, so that the catalyst does not react with free acid to form an insoluble material which would remove the catalyst from the system.

In this particular example the base yield was 1887 grams which was cut to 50% solids using the same solvent as in the previous example.

The resulting product had a viscosity of U+ (Gardner-Holdt), a color of 1, an acid value of 0.8 and a final cure of 24 to 27 seconds.

Example 9

50.5 grams of sebacic acid, 125 grams of para-tertiary butyl benzoic acid, 200 grams of dimethyl isophthalate, and 147 grams of trimethylolethane were reacted in the same manner as in the previous example, the final temperature of the cook being 450° F. This product was obtained in a base yield of 410 grams and cut to 65% solids using a 9:1 butyl Cellosolve:xylol solvent.

This product had a viscosity of V—, a color of 6 and an acid value of 1.1.

Example 10

201 grams of azelaic acid, 520 grams of trimethylolethane, 403 grams of phthalic anhydride and 260 grams of dimethylisophthalate were processed to 420° F. in the manner aforesaid. The base yield was 1200 grams and the vehicle was cut to 55% solids using a solution of 3½ parts of butyl Cellosolve to 1 part of xylol.

This product had a final viscosity of W, a color of 4–5, an acid value of 13.2 and a cure of 20 seconds. Note here that the presence of phthalic anhydride has made the attainment of an acid number less than about 5 impossible.

*Example 11*

This is an example of a formulation of a baking enamel illustrative of the use of the vehicles of the present invention.

350 lbs. of rutile titanium dioxide and 97 lbs. of the vehicle of Example 1 were ground together in a Werner-Pfleiderer mixer to a 7H grind. In order to get the material out of the mill, an additional 88 lbs. of the vehicle were added. The resultant mixture was then let down with 290 lbs. of the same vehicle, 183 lbs. of a benzo-guanimine-formaldehyde resin and 107 lbs. of methyl isobutyl ketone. The resultant product had a NVM (non-volatile matter) of 64.1% and a weight per gallon of 11.02 lbs. When this material was reduced 15% with methyl isobutyl ketone, it had a viscosity of 20 to 22 seconds at 75° F. in a No. 4 Ford cup.

*Example 12*

6 lbs. of acidic lamp black and 75 lbs. of melamine-formaldehyde (butylated) were admixed and ground in a roller mill to a 7H fineness. The product was removed from the mill and 40 lbs. of non-leafing aluminum pigment added and mixed in. Thereafter 585 lbs. of polyester produced in accordance with Example 5 above, 157 lbs. of methylisobutyl ketone and 7 lbs. of an 0.4% solution of 500 centistokes DC 200 fluid (polymethylsilicone) in xylol were added. The resulting product had a weight per gallon of 8.45 lbs. and when reduced 20 to 25% with methylisobutyl ketone, it had a viscosity of 14 to 16 seconds at 75° F. in a No. 4 Ford cup.

Other pigments may be used in place of titanium dioxide including cadmium lithopones, red, yellow and maroon, copper phthalocyanine blues and greens, indanthrene blue, etc.

From the foregoing examples, it will be observed that temperatures generally in the range from about 350° F. to 450° F. may be employed in producing these polyesters. The processing time is dependent upon a number of factors, particularly the proportion of dibasic aliphatic acid present in the reaction mass. In general, the ratio of aromatic dibasic acid ester to aliphatic dibasic acid is from 3:1 to 1:3–4. A lower aromatic acid ester content results in rapid processing and somewhat higher acid values. The amount of aliphatic acid is generally determined by the degree of flexibility desired, the higher quantities producing greater flexibility.

The excess hydroxyl content present in all of the examples may range from about 10 to about 45% or even higher depending upon the amount of amino resin to be used and the final cost of the mixture. A 20 to 35% excess hydroxyl content is probably the most desirable form when all points of view are considered.

The amount of amino resin (melamine-aldehyde, alkylated melamine-aldehyde, urea-aldehyde wherein the aldehyde is one containing from 1 to 4 carbon atoms) ranges from about 10 to 35% or higher. Economic considerations and the increasing brittleness with larger quantities of the amino resin would tend to limit the amount used.

When these coatings are pigmented in the usual formulation procedure, a product is obtained which has a baking schedule of from about 30 to 40 minutes at about 400° F. If a lower temperature, i.e., 350° F. is used, the material can be softened by acetone.

In the previous examples a catalyst is sometimes employed, particularly calcium oxide. Any of the alkaline earth oxide or hydroxide, for example, litharge, barium oxide, barium hydroxide, magnesium oxide, magnesium hydroxide, etc. could be used. While the alkali metal oxides and hydroxides also have catalytic effect, even small amounts in the final coatings have a deleterious effect on the films. They are too water-sensitive and tend to cause discoloration.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. The process of making a viscid oil-free composition of matter having an acid value less than 5 which comprises heating together at a temperature between about 350° F. and 450° F. a saturated aliphatic polyol containing at least 3 OH groups attached to different non-adjacent carbon atoms, an alkyl di-ester of an aromatic dibasic acid selected from the group consisting of isophthalic acid, terephthalic acid, and mixtures thereof, the alkyl group containing from 1 to 4 carbon atoms, and an aliphatic dibasic acid having the general formula:

$$HO_2C(CH_2)_nCO_2H$$

wherein $n$ is a number from 1 to 8 inclusive, the proportion of said polyol being such as to provide an average of from about 1.2 to about 1.5 hydroxyl groups per carboxyl group, and the ratio of carboxyl groups in the aliphatic dibasic acid to the carboxyl groups in the aromatic di-ester being from about 3:1 to about 1:4.

2. The process of making a viscid oil-free composition of matter having an acid value less than 5 which comprises heating together in the presence of a catalytic amount of an alkaline earth oxide at a temperature between about 350° F. and 450° F. a saturated aliphatic polyol containing at least 3 OH groups attached to different non-adjacent carbon atoms, an alkyl di-ester of an aromatic dibasic acid selected from the group consisting of isopthalic acid, terephthalic acid and mixtures thereof, the alkyl group containing from 1 to 4 carbon atoms and an aliphatic dibasic acid having the general formula:

$$HO_2C(CH_2)_nCO_2H$$

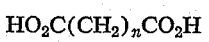

wherein $n$ is a number from 1 to 8, inclusive, the proportion of said polyol being such as to provide an average of from about 1.2 to about 1.5 hydroxyl groups per carboxyl group, and the ratio of carboxyl groups in the aliphatic dibasic acid to the carboxyl groups in the aromatic di-ester being from about 3:1 to about 1:4.

3. A process in accordance with claim 1 in which the aliphatic polyol is trimethylol ethane.

4. A process in accordance with claim 1 in which the aromatic dibasic acid is isophthalic acid.

5. A process in accordance with claim 1 in which the di-ester of the aromatic dibasic acid is dimethyl isophthalate.

6. A process in accordance with claim 1 in which the aliphatic dibasic acid is adipic acid.

7. A process in accordance with claim 1 in which the aliphatic polyol is trimethylol ethane, the di-ester of an aromatic dibasic acid is dimethyl isophthalate, and the aliphatic dibasic acid is adipic acid.

8. A viscid oil-free composition of matter having an acid value less than 5 produced in accordance with the process of claim 1.

References Cited in the file of this patent

UNITED STATES PATENTS

| | | |
|---|---|---|
| 2,683,100 | Edgar et al. | July 6, 1954 |
| 2,727,881 | Caldwell | Dec. 20, 1955 |
| 2,744,078 | Caldwell | May 1, 1956 |

FOREIGN PATENTS

| | | |
|---|---|---|
| 629,490 | Great Britain | Sept. 21, 1949 |